United States Patent [19]
Lindenthal

[11] 4,361,211
[45] Nov. 30, 1982

[54] HYDRODYNAMIC BRAKE

[75] Inventor: Hans Lindenthal, Heidenheim-Mergelstetten, Fed. Rep. of Germany

[73] Assignee: Voith Getriebe KG, Fed. Rep. of Germany

[21] Appl. No.: 220,446

[22] Filed: Dec. 29, 1980

[30] Foreign Application Priority Data

Jan. 10, 1980 [DE] Fed. Rep. of Germany ....... 3000664

[51] Int. Cl.$^3$ ............................................ F16D 57/04
[52] U.S. Cl. .................................................. 188/296
[58] Field of Search ............... 188/290, 292, 293, 294, 188/296

[56] References Cited

U.S. PATENT DOCUMENTS

3,481,148 12/1969 Muller et al.
4,194,600 3/1980 Lindenthal.

FOREIGN PATENT DOCUMENTS

1750272 1/1971 Fed. Rep. of Germany.
2135268 1/1973 Fed. Rep. of Germany ...... 188/296
1049219 12/1953 France ................................. 188/296
1261041 1/1972 United Kingdom.
1342228 1/1974 United Kingdom.
1365670 9/1974 United Kingdom.

Primary Examiner—Duane A. Reger
Attorney, Agent, or Firm—Ostrolenk, Faber, Gerb & Soffen

[57] ABSTRACT

The disclosure concerns a hydrodynamic brake with a rotor blade wheel and an opposed stator blade wheel together defining a toroidal working chamber for containing working fluid. The blades of one or both of the blade wheels are swingable about respective radial axes so as to be skewed at an oblique orientation when the rotor blade wheel is rotated with working fluid in the working chamber. The blades are swingable from a first skewed orientation caused by one direction of rotation of the rotor blade wheel, to an idle orientation at which the blades are generally parallel to the axis of the brake and to an opposite skewed orientation which occurs when the rotor blade wheel rotates in the opposite direction. The torus wall outside the outside edges of the swingable blades is separated into independent sections and the torus wall sections are attached to respective blades for swinging therewith. In one embodiment, two neighboring blades are joined by a torus wall section, thereby defining a U-shaped cross-section blade member.

18 Claims, 6 Drawing Figures

HYDRODYNAMIC BRAKE

BACKGROUND OF THE INVENTION

The present invention concerns a hydrodynamic brake, of the Foettinger type, including a bladed rotor wheel and a bladed stator wheel which together form a toroidal working chamber that is variably filled with working fluid for selectively applying and releasing braking force between two objects connected by the hydrodynamic brake.

Such a hydrodynamic brake is known from German Application, DE-OS No. 17 50 272. In that case the blades of the rotor and/or stator blade wheel are swingable about respective radially oriented axes in order to control the braking torque and in particular to reduce the air resistance loss in the brake during the disconnected condition of the brake (i.e. reducing the power consumption in the empty condition of the working chamber of the brake). In the engaged or operative condition of the brake, the swingable blades have swivelled to their ordinary oblique orientations with respect to the direction of rotation of the rotor blade wheel, which assures a high braking torque. With reference to the direction of rotation of the rotor, this is the so-called skewed position. In this case, the rear blade edges lie against the wall of the torus. In the disengaged condition of the brake, on the other hand, i.e. with the working chamber empty, the blades swivel to extend parallel to the direction of rotation and thus provide virtually no air resistance to the rotation of the rotor blade wheel.

It is believed that this known brake has not been introduced into actual practice, probably because different braking torques can be simply selected by changing the degree of admission of working fluid into the brake and that other well-proven measures have also been found for reducing the air resistance loss in the working chamber, for instance as shown in German Pat. Nos. 16 75 263, 21 35 268, and 22 27 624.

However, when a hydrodynamic brake which acts independently of the direction of rotation of the rotor blade wheel has been required, two operating spaces have had to be provided, for instance in accordance with German Pat. Nos. 16 00 191 or 27 57 240. This is unsatisfactory.

SUMMARY OF THE INVENTION

The object of the present invention is to create a single-flow hydrodynamic brake which can be used as universally as possible.

Another object is to provide such a brake which operates suitably for both directions of rotation of the rotor blade wheel.

In the hydrodynamic brake of the invention, the blades of at least one and preferably both of the rotor blade wheel and the stator blade wheel are each generally in a respective plane and are swivelable or pivotable about a respective radially extending axis provided for each blade, or for a group thereof, so that when the working chamber is at least in part filled with working fluid, the swingable blades of the blade wheels are swivelled by the force of the working fluid. The blades of the rotor blade wheel are supported at locations along the blades so that they are swivelled to face obliquely forward in the direction of rotation. Correspondingly, the blades of the stator blade wheel are so pivotally mounted that they are swivelled to face obliquely rearward with respect to the direction of rotation of the rotor blade wheel. The oblique orientation of the blades is referred to as their skewed orientations.

In a known hydrodynamic brake (such as that shown in German Application DE-OS No. 17 50 272), the torus wall which deflects the flow is a rigidly immovable wall in the corresponding blade wheel. The wall blocks the swingable blades from being brought into a paraxial position, i.e. an orientation where the blades extend parallel to the rotation axis of the rotor blade wheel. In contrast, the torus wall in accordance with the present invention is separated into separate sections around the respective blade wheel, and individual sections of the torus wall are attached to respective adjacent swingable blades for swiveling therewith. This makes it possible to swivel the blades within an entirely different range of swing than in the case of the known brake. The blades can now be swung from the ordinary oblique or skewed orientation at least to the paraxial orientation. The paraxial orientation can be the idling position since in this case the power consumption of the brake is already substantially reduced as compared with the skewed orientation, i.e. there is a reduction of air resistance loss in the disconnected condition of the brake which is already sufficient for many purposes of use. For instance, when both the rotor and the stator blades are swung out of the skewed orientation into the paraxial orientation, a reduction in the power consumption to about 10% of the original value is to be expected.

This is shown by comparative measurements on traditional hydrodynamic brakes with oblique blading and on traditional hydrodynamic couplings with paraxial blading.

An even more important advantage of the invention, however, resides in the fact that the swingable blades can even be swiveled from one skewed orientation beyond the paraxial orientation into a position of opposite oblique inclination, a second skewed orientation. With a constant direction of rotation for the rotor blade wheel, this is the so-called "trailing" oblique orientation.

This latter orientation can in its turn be the idling position if the brake is in this connection emptied. However, this blade orientation is the skewed orientation for the other direction of rotation of the rotor blade wheel. Therefore, the blade position which is the trailing orientation for the one direction of rotation is the skewed blade position for the other direction of rotation. Thus, the greater range of swing of the blades obtainable by the invention can be utilized so that the brake is fully active in both directions of rotation of the rotor blade wheel, despite the presence of only a single operating space.

In general, when a brake operates independently of the direction of rotation, it is desirable that the brake produce the same value of braking torque in both directions of rotation. Therefore, in the invention, each section of the torus wall which is combined with a swingable blade is arranged, as seen in cylindrical section through the working chamber, preferably at least approximately perpendicular to the corresponding blade plane. The torus wall thus extends parallel to the circumferential direction of the brake as long as the blades are paraxial. However, as soon as the blades are inclined obliquely, the torus wall sections are arranged stepwise, in the manner of a staircase. In a modification of the foregoing arrangement of the torus wall, the torus wall sections can form an angle of other than 90° with the respective blades.

In a preferred embodiment of the invention, at least two circumferentially adjacent blades on one and/or both of the rotor blade wheel and stator blade wheel are combined together with a section of the respective torus wall to thereby form a swivelable blade chamber or cup, which would have a generally U-shaped cross-section, comprised of the two adjacent blades with the torus wall defining the web of the U. Each U-shaped blade chamber or swing cup has an axis of swing that can be arranged in the central plane of the U profile. But, if necessary, this axis can also be alongside of the central plane and therefore asymmetrical. This manner of construction makes it necessary to move the two blade wheels slightly apart along the axis of the brake. In this way, the inside distance between the blade wheels is relatively large in the paraxial orientation of the swingable blades, while that distance is considerably smaller in the skewed orientation of the blades. This is, however, entirely favorable since in the paraxial orientation of the swingable blades, a further reduction in the air resistance loss is obtained.

The transitions from the blades to the torus wall pieces can be polygonal but are preferably rounded.

In accordance with the invention, there is another manner of construction in which each swingable blade is separate from its neighbor, and together with its part of the torus wall, as seen in cylindrical section, the blade and wall section form a T-shaped cross-section. In this case, the axis of swing, as in the known brake of German Application DE-OS No. 17 50 272, is arranged at least approximately at the edge of the blade which is struck by the flow. In this arrangement, it is not necessary to move the two blade wheels apart. In accordance with yet another manner of construction, each swingable blade is separate from its neighbor, and a respective section of the adjacent torus wall is defined at only one lateral side of the respective swingable blade, thereby to form a swingable element of generally L-shaped cross-section.

Based on German Application DE-OS No. 17 50 272, other techniques are also conceivable for obtaining the range of swing of the blades from the first skewed orientation, at least up to the paraxial orientation or even up to the opposite skewed or trailing orientation. Thus, for instance, only a front portion of a blade (for instance about two-thirds of the entire blade), which faces the other blade wheel, can be made swingable and the remaining, rear portion of the blade may be left firmly attached to the then rigid torus wall. In this way, however, there can be obtained only a reduction in the air resistance loss. This manner of construction is less suitable for a brake which is independent of the direction of rotation.

Furthermore, in the case of a brake developed similarly to that in German Application DE-OS No. 17 50 272, in which entire blades are swingable, the torus wall can be formed to define a distance between itself and the path of swing of the rear edges of the blades. The torus wall might then no longer extend parallel to the peripheral direction but includes a depression at the rear edge of each swingable blade to provide that above noted spacing between the blade and the torus wall. This distance can vary along the path of swing of the blade rear edge. It is merely important that in the skewed blade orientation, i.e. when the brake is to be fully active, the distance shown should be as small as possible so that the flow cannot move away. On the other hand, it may be advantageous if the said distance is relatively large in the paraxial position of the blades since this contributes to reducing the air resistance loss.

The brake in accordance with the invention can be equipped with an actuating device to swing the blades, for instance in accordance with the example of West German Application DE-OS No. 17 50 572. Preferably, however, such an actuating device is dispensed with. Instead, based on the known brake in accordance with German Pat. No. 16 75 623, a restoring force, in the form of restoring means, such as a spring, hold the swingable blades in their idle position, that is in the paraxial or trailing orientation, when the working chamber of the brake is empty and the restoring means operate against the dynamic pressure of the flow of air. In a preferred embodiment of the invention, the restoring means comprises appropriate biasing means, e.g. a spring that acts against a cam on a respective blade to normally drive the blade to its idle position, i.e. its paraxial orientation. Furthermore, in the engaged condition of the brake, with the working chamber filled with working fluid, the restoring means is of a strength such that it may be overcome, whereby the blades may be held in their skewed orientation by the dynamic pressure of the flow of liquid Here, the swingable blades pass automatically into the position required at the time as a function of the direction of rotation of the rotor blade wheel and of the filling fluid in the working chamber, namely liquid or air.

Other objects and features of the invention will become apparent from the following description of a preferred embodiment of the invention, considered with reference to the accompanying drawings.

DESCRIPTION OF A PREFERRED EMBODIMENT

Figure 1:
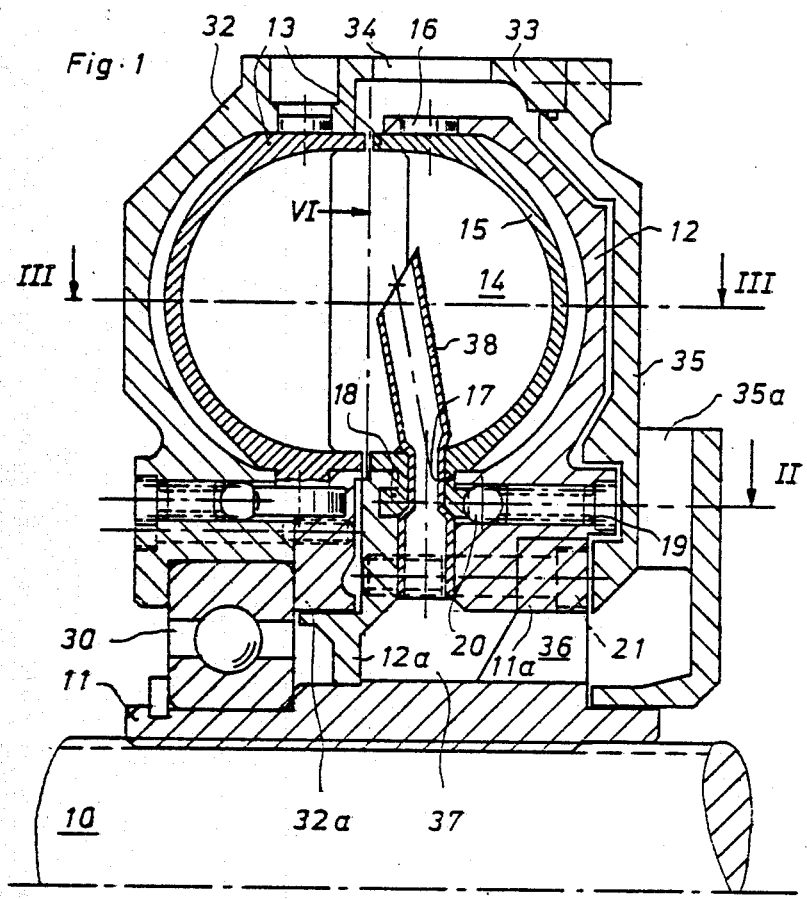
FIG. 1 shows a partial longitudinal section through an embodiment of a hydrodynamic brake in accordance with the invention.

Referring to FIG. 1, the hydrodynamic brake is arranged on a rotor shaft 10. A rotor hub 11 which has a hub flange 11a is secured for rotation to the shaft 10. A rotor shell 12 is fastened to the hub flange 11a and the rotor shell 12 surrounds half of a toroidal, open, inner space. Different from traditional hydrodynamic brakes, the rotor shell 12 does not have any blades formed in it. Instead, U-shaped blade chambers with the U-shaped cross-sections illustrated, so-called swing cups 13, are inserted in and supported on the rotor shell 12. They form movable blade chambers. The rotor shell 12 and the swing cups 13 arranged therein together form the rotor blade wheel.

Figure 6:
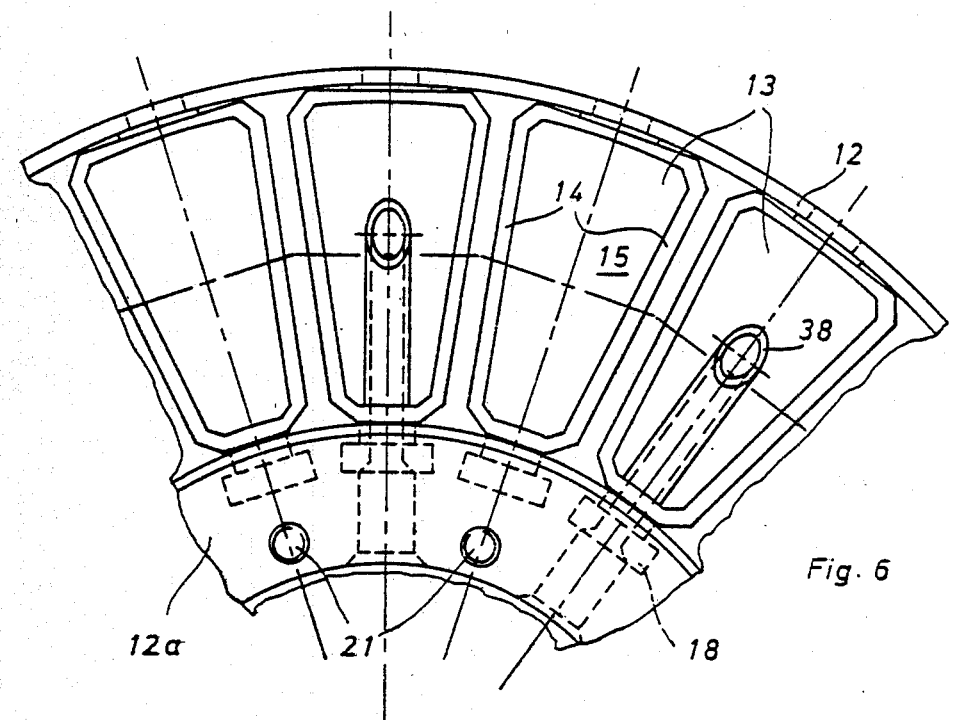
FIG. 6 is a fragmentary view of the rotor, viewed in the direction of arrow VI in FIG. 1.

Each swing cup 13 is comprised of two vertical, parallel, spaced apart, neighboring blades 14 and an independently movable section 15 of the annular, flow guiding torus wall. Each blade is a generally flat plate substantially in its own plane. The first torus wall section of a respective swing cup is also a flat plate which meets both blades 14 at the top perpendicular to their planes, at a slightly rounded transition. A plurality of swing cups are distributed in a uniform annular array around the periphery of the rotor shell 12 (see FIG. 6).

The swing axes of the swing cups 13 respectively extend in radial directions. Each swing cup has a radially outer pivot pin 16 and a radially inner pivot pin 17. The position of the pivot pins 16 and 17 in the swing cups and along the length of the blades is selected so that the resistance of the working fluid in the working chamber will cause the swing cups to swivel as described herein.

In the region of the radially inner pivot pin 17, the rotor shell 12 is divided, i.e. it has a removable cover ring 12a. After the insertion of the swing cups 13, the ring 12a is placed on the rotor shell 12. Screws 21 serve to connect the cover ring 12a with the rotor shell 12 and at the same time to connect the rotor shell 12 with the hub flange 11a.

Figure 2:
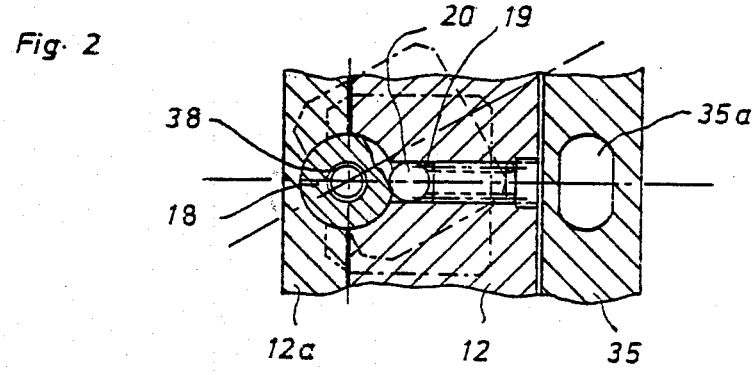
FIG. 2 is a partial section along the line II of FIG. 1.
Figure 3:
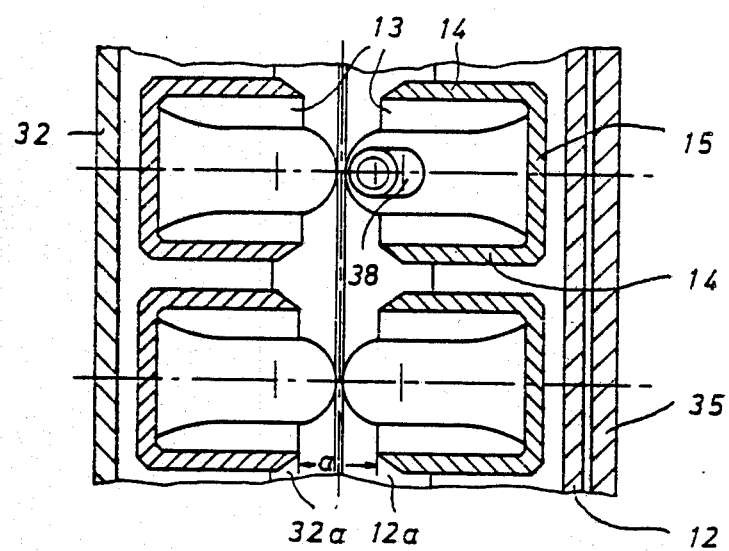
FIG. 3 is a view of a fragment, viewed in cylindrical section, i.e. a developed view, of the brake and viewed at the line III—III of FIG. 1, showing the condition with the brake empty of working fluid.

On the inner pivot pin 17, there is a shoulder 18. It serves, on the one hand, to guide the swing cup in the radial direction, i.e. it transmits the centrifugal force acting on the swing cup to the rotor shell. On the other hand, the shoulder 18 cooperates with a coil compression spring 19 to bring the swing cup, in the empty condition of the brake, into the so-called idling position which is shown in FIG. 3. The spring 19 is arranged, together with a steel ball 20, in a paraxially extending borehole in the rotor shell. The shoulder 18 has an outer contour in circumferential cross-section which is other than circular, in that a section is substantially removed from the circular shoulder defining a flattened part (see FIG. 2). The biasing means or spring 19 acts against this region of the shoulder through the ball 20. In order to stabilize the idling position of the swing cups, a small depression can furthermore be provided on the flattened part of the shoulder 18. Thus, the swing cups are normally restored to the idling, paraxial orientation and will remain at that orientation when working fluid is absent from the working chamber. The spring force of the spring 19 is selected so that in the presence of working fluid in the working chamber, the force of the working fluid on the blades 14 readily overcomes the force of the spring 19 permitting the swing cups to assume their skewed orientations illustrated in FIGS. 4 and 5 and described below.

Opposite the rotor blade wheel, there is a stator blade wheel which is developed in a similar manner. It includes a stator shell 32, in which the rotor hub 11 is supported by means of an anti-friction bearing 30, and a cover disk 32a and several swing cups 13 which may be substantially identical to those of the rotor blade wheel, whereby they include respective blades and a respective second torus wall section for the blades of the respective swing cup. The stator shell 32 has a housing cover 33 which includes the customary outlet 34. A rear wall 35 is screwed to the housing cover 33. An inlet channel 35a is formed in the rear wall. From channel 35a, several boreholes 36 lead through the hub flange 11a into an annular space 37 which is surrounded by the hub 11 on the outside, the rotor shell 12 on the inside and the cover ring 12a. The inner pivot pin 17 of every second swing cup 13 of the rotor blade wheel has a borehole that is concentric with the pivot pin, i.e. it extends in the radial direction. An inlet tube 38 is inserted in this bore hole. The inlet tubes 38 connect the annular space 37 with the inside or working chamber of the brake.

As mentioned above, the swing cups 13 assume their idle positions shown in FIG. 3 when the brake is empty, which means that the working chamber is empty. The above noted shoulder 18, spring 19 and ball 20 cooperate in this. In this blade orientation, the power consumption of the brake is extremely small, on the one hand because the blades 14 are parallel to the axis of rotation of the brake and on the other hand because the distance a between the blade edges which move past each other is relatively large. The condition shown in FIG. 3 applies for both rotor directions of rotation of the rotor blade wheel.

Figure 4:
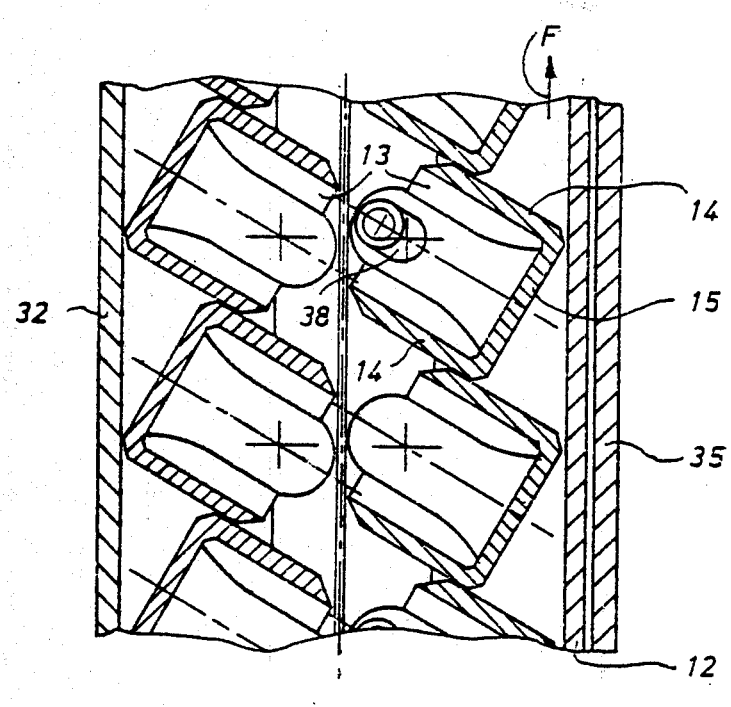
FIG. 4 is a view of a fragment, viewed as in FIG. 3, but in the condition with the brake at least partially filled and with the rotor rotating in one direction.
Figure 5:
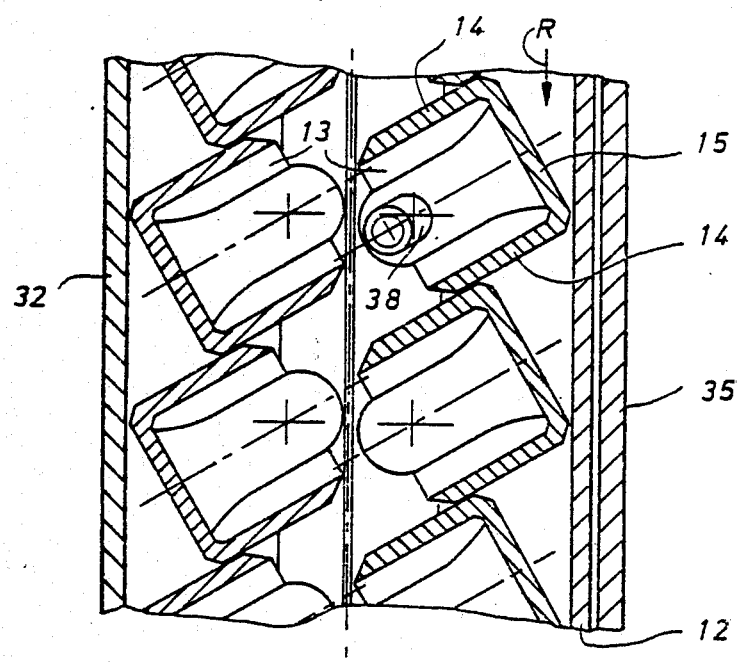
FIG. 5 is a view of a fragment, viewed as in FIG. 4, but with the rotor rotating in the opposite direction.

FIGS. 4 and 5 show the respective positions of the swing cups in the two mutually opposite rotor directions of rotation when the working space of the brake is at least partially filled with liquid. The directions of rotation are designated by the arrows F and R, respectively. It can be seen that in both cases, the blades are in a skewed orientation. The pivots 17 and 18 are far enough toward the open opposed sides of the cups 13 that the working fluid in the working chamber causes the swing cups 13 to rotate so that the open sides of the rotor wheel swing cups face toward the direction of rotation of the rotor, while the open sides of the swing cups of the stator wheel face in the opposite direction. Thus, the blades of the rotor blade wheel swing to face toward the direction of rotation of that wheel, measured along those blades in the direction toward the stator blade wheel, and the blades of the stator blade wheel swing to face in the opposite, trailing direction. The oblique angles of the blades are determined by the sides of adjacent swing cups 13 striking each other. Inherently, the torus wall sections pivot and change their orientations correspondingly with their respective attached blades.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A hydrodynamic brake comprising:
   a rotor blade wheel and an adjacent stator blade wheel, the blade wheels being respectively shaped and positioned for defining a toroidal working chamber between them;
   an inlet into and an outlet from the working chamber for working fluid;
   each of the rotor blade wheel and the stator blade wheel respectively supporting an annular array of blades in the working chamber;
   at least in the condition of the hydrodynamic brake in which working fluid is present in the working chamber, and when the blades of the blade wheels are viewed in cylindrical or developed section, the blades of the rotor blade wheel are skewed to incline obliquely forward in the direction of rotation of the rotor blade wheel and being thus inclined in the direction toward the blades of the stator blade wheel, while the blades of the stator blade wheel are also oriented in skewed manner to incline obliquely rearward, counter to the direction of rotation of the rotor blade wheel, and the blades of the stator blade wheel being thus inclined in the direction toward the blades of the rotor blade wheel;

for at least one of the rotor blade wheel and the stator blade wheel, each blade thereof being swingable about a swing axis that extends substantially radially of the blade wheels; each of the swingable blades being swingable over a range from the respective skewed orientation thereof up to at least an orientation at which the blade is generally parallel to the rotation axis of the rotor blade wheel;

the toroidal chamber including a respective first torus wall which is located beyond those edges of the blades of the rotor blade wheel that are away from the blades of the stator blade wheel and a respective second torus wall which is located beyond those edges of the blades of the stator blade wheel that are away from the blades of the rotor blade wheel;

each torus wall adjacent the swingable blades being divided into separate, independently movable torus wall sections; individual sections of the respective torus wall being attached to different ones of he swingable blades for swinging therewith, to thereby change the orientation of the torus wall sections with the orientations of the swingable blades.

2. The hydrodynamic brake of claim 1, wherein for both of the rotor blade wheel and the stator blade wheel, the respective blades thereof are swingable.

3. The hydrodynamic brake of claim 1, wherein sets comprised of two neighboring swingable blades are combined with one of the torus wall sections, to define a swingable blade chamber having a generally U-shaped cross-section, as viewed along the cylindrical or developed cross-section of the respective blades, with the open end of the U facing toward the blades of the other blade wheel.

4. The hydrodynamic brake of any of claims 1, 2 or 3, wherein each swingable blade is shaped to be located generally in its own plane; the respective torus wall section attached to one of the blades is oriented generally perpendicular to the plane of that blade.

5. The hydrodynamic brake of claim 1, wherein each of the swingable blades is swingable through a further range beyond the orientation thereof at which that blade is parallel to the axis of the rotor blade wheel and is swingable to a second skewed condition with an oblique orientation that is in the opposite direction from the first mentioned oblique orientation thereof.

6. The hydrodynamic brake of either of claims 1 or 5, further comprising restoring means for normally restoring the orientation of the swingable blades to an idle orientation away from the skewed orientation thereof, the restoring means being strong enough to hold the swingable blades in the idle orientation against the force of the air in the working chamber operating upon the swingable blades, and the restoring means being weak enough to enble the swingable blades to swing to their skewed orientation under the influence of working fluid in the working chamber.

7. The hydrodynamic brake of claim 6, wherein the idle orientation of the swingable blades is generally parallel to the axis of the rotor blade wheel.

8. The hydrodynamic brake of either of claims 1 or 5, further comprising a respective swivel mount in the respective blade wheel for each swingable blade.

9. The hydrodynamic brake of claim 8, wherein each of the swivel mounts is so positioned along the length of the blades as measured in the direction toward the other blade wheel, as to cause the swingable blades to move to their skewed conditions as the rotor blade wheel rotates with working fluid in the working chamber.

10. The hydrodynamic brake of claim 5, wherein for both of the rotor blade wheel and the stator blade wheel, the respective blades thereof are swingable.

11. The hydrodynamic brake of claim 10, wherein the blades are so mounted to their respective blade wheels that the blades of both blade wheels swing simultaneously from one skewed orientation up to at least their idle orientation.

12. The hydrodynamic brake of claim 11, further comprising a respective swivel mount in the respective blade wheel for each swingable blade.

13. The hydrodynamic brake of claim 12, wherein each of the swivel mounts is so positioned along the length of the blades as measured in the direction toward the other blade wheel, as to cause the swingable blades to move to their skewed conditions as the rotor blade wheel rotates with working fluid in the working chamber.

14. The hydrodynamic brake of claim 12, wherein each swingable blade is located generally in a plane and as it swings, the orientation of its plane changes, the respective torus wall section attached for movement to one of the blades is oriented generally perpendicular to the plane of that blade;

sets comprised of two neighboring swingable blades are each combined with a single torus wall section to define a swingable blade chamber having a generally U-shaped cross-section as viewed along the cylindrical or developed cross-section of the respective blades, with the open end of the U facing toward the blades of the other blade wheel.

15. The hydrodynamic brake of claim 12, further comprising restoring means for normally restoring the orientation of the swingable blades to an idle orientation away from the skewed orientation thereof and the restoring means being strong enough to hold the swingable blades in the idle orientation against the force of the air in the working chamber operating upon the swingable blades, and the restoring means being weak enough to enable the swingable blades to swing to their skewed orientation under the influence of working fluid in the working chamber.

16. The hydrodynamic brake of claim 15, wherein the idle orientation of the swingable blades is generally parallel to the axis of the rotor blade wheel.

17. The hydrodynamic brake of claim 15, wherein the restoring means comprises each blade having a cam defined thereon, a spring supported at the respective blade wheel for applying pressure on the cam, and the cam being shaped for causing the blade to swing to its idle orientation.

18. The hydrodynamic brake of claim 17, further comprising a ball between the cam and the spring for riding over the cam as the respective blade swings.

* * * * *